(12) United States Patent
Tippmann

(10) Patent No.: US 6,539,839 B1
(45) Date of Patent: *Apr. 1, 2003

(54) UNIFORM TEMPERATURE COOKING SURFACE

(76) Inventor: Eugene R. Tippmann, 10801 Pine Mills Rd., Ft. Wayne, IN (US) 46845

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,587

(22) Filed: Oct. 7, 1997

(51) Int. Cl.[7] .............................. A47J 37/00; A47J 37/06
(52) U.S. Cl. .............................. 99/331; 99/349; 99/422; 99/425
(58) Field of Search .................... 99/444–446, 330–333, 99/340, 400, 349, 374–377, 379, 380, 372, 422, 425; 219/524, 525; 126/374, 378, 376, 389, 390; 165/104.21, 104.26; 100/92, 257, 319, 320, 233

(56) References Cited

U.S. PATENT DOCUMENTS

| | | |
|---|---|---|
| 3,853,112 A | 12/1974 | Lazaridis et al. |
| 3,968,787 A | 7/1976 | Basiulis |
| 4,245,147 A | 1/1981 | Cummings et al. |
| 4,660,542 A | 4/1987 | Scherer |
| 4,955,361 A | 9/1990 | Sotani et al. |
| 5,235,903 A | 8/1993 | Tippmann |

*Primary Examiner*—Timothy F. Simone
(74) *Attorney, Agent, or Firm*—Nixon Peabody LLP; Donald R. Studebaker

(57) ABSTRACT

A cooking system and more specifically, a griddle type cooking system having a heating surface wherein a temperature of the griddle heating surface is substantially uniform across the entire surface is provided. This uniform surface temperature is maintained even when food products are placed on only a portion of the cooking surface. The cooking system minimizes overcooking of an outer surface of the food product in order to substantially reduce or eliminate the generation of mutagens or carcinogens while under cooking of the food product is likewise minimized thus eliminating harmful bacteria within the food product. The cooking system includes a sealed cooking medium chamber having a substantially planar top cooking surface, a bottom surface and side walls for housing a heating medium in the form of water. A mechanism for heating the water within the cooking medium chamber is provided either within the chamber itself or adjacent the chamber with a control device being provided to control a temperature of the top cooking surface wherein the temperature of the top cooking surface is uniform over an entire exposed surface of the top cooking surface.

20 Claims, 1 Drawing Sheet

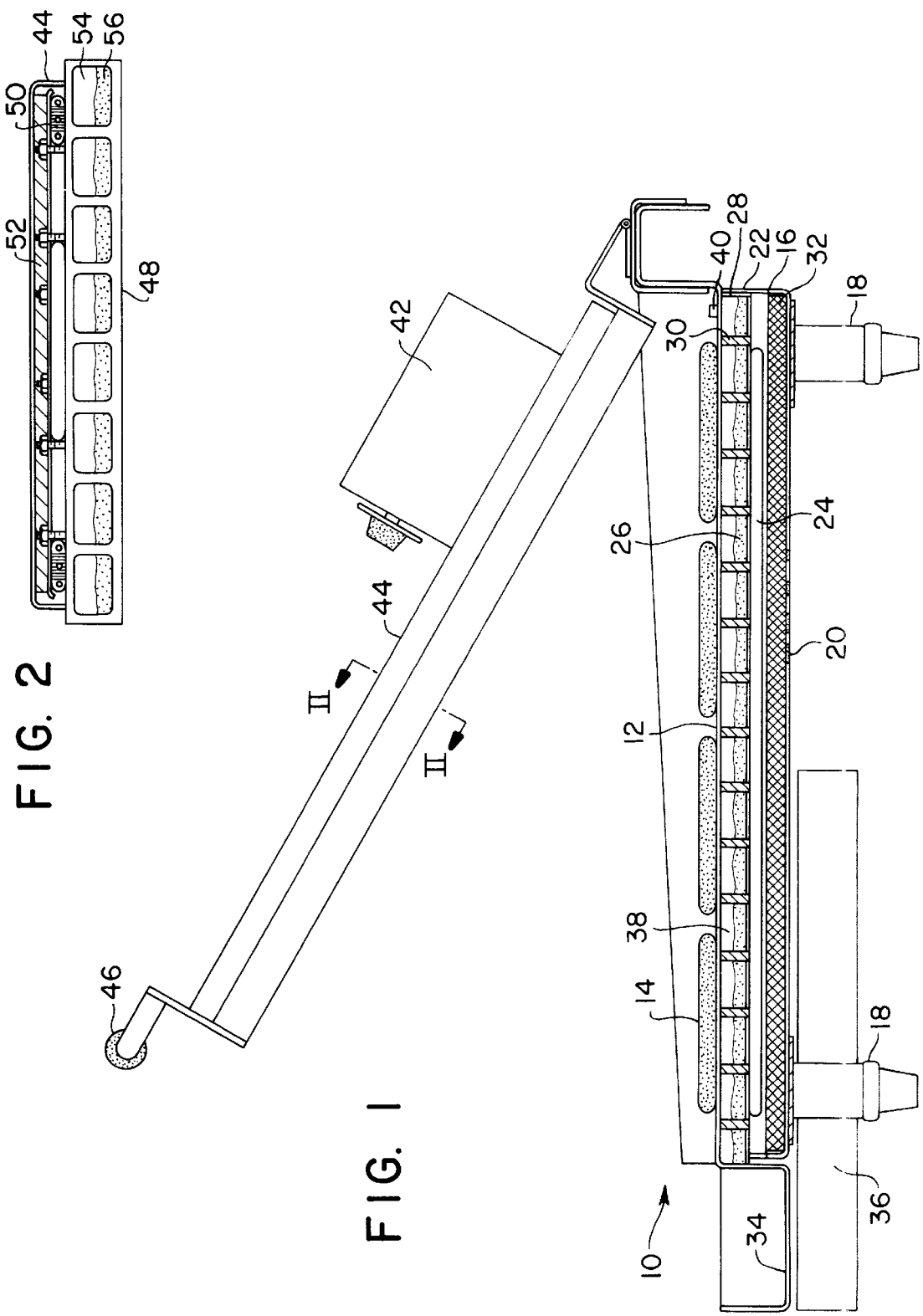

UNIFORM TEMPERATURE COOKING SURFACE

The present invention is directed to a griddle having a uniform temperature heating surface. More particularly, the present invention is directed to a griddle wherein the cooking surface is heated by way of a steamed chamber with the temperature of the heating surface being substantially uniform throughout.

BACKGROUND OF THE INVENTION

There are a wide variety of known cooking techniques and there has been, within each, a great deal of experimentation with the several variables associates with such cooking techniques. For example, the use of steam as a heat transfer medium is well-known. Such steam cooking devices may employ the steam at atmospheric pressure utilizing convection heat transfer. In this regard, most commercial cooking equipment is highly specialized and include integrally designed burners specifically adapted for the particular unit. Because of the variety of such specialized forms of cooking equipment, it has not been possible to effectively optimize the manufacturer of such equipment. Moreover, the design of present commercial cooking equipment has focused primarily on speed and capacity of cooking with little regard to energy utilization efficiencies. Additionally, little significance has been placed on the production of the food product itself. That is, whether the food product is substantially cooked in order to avoid harmful bacteria or overcooked generating mutagens or carcinogens which are likewise undesirable for human consumption.

There has been a significant amount of research into eating habits as they relate to health. For example, in the article *Prevention of Formation of Important Mutagens/Carcinogens in the Human Food Chain* by Weisburger and Jones, it is pointed out that during cooking (typically frying or boiling) leading to the browning of meat or fish, mutagens or carcinogens are frequently generated. The article suggests the desirability of finding ways to lower or prevent the formation of these undesirable products during cooking. One scheme for lowering these undesirable products is to reduce the surface temperature during cooking. Another is to add additives to the meat or fish prior to the cooking process.

From the above article, it appears that the undesirable mutagens or carcinogens will be generated on the food surface during cooking, for example, of hamburger on a conventional hot grill and that these undesirable products will be scraped off the grill with the meat and placed in the consumer's sandwich.

The current method for cooking hamburger, for example, requires a lot of fat for three reasons. The fat acts as a release agent preventing the meat from sticking to the griddle and acts as a heat transfer medium itself. Finally, the fact provides the juiciness in the finished sandwich. The undesirability of the conventional "fast food" approach to cooking beef for sandwiches on a hot grill is now apparent.

In order to avoid the creation of such mutagens and carcinogens is to lower the cooking temperatures which not only reduces or eliminates the formation of such mutagens and carcinogens, but also provides a more palatable product. Exposing the meat to high temperatures causes the fibers in the meat to shrink, purging the meat of its natural juices. Such high temperature cooking also cooks the outer surface to its "done" state prior to the interior reaching that "done" condition. Thus, the outer portions are frequently comparatively overcooked, dry and tough while the interior is left virtually uncooked. Reducing cooking temperatures ensures that the food product will not only not be overcooked on the outside, but will be substantially cooked on the inside regardless of the time the food product is subjected to that reduced temperature.

As noted hereinabove, while overcooking of an outer surface of the food product is of concern, under cooking of the interior of the food product is likewise is of a significant health concern. It is a common occurrence that the interior portion of a hamburger is often left under cooked with this under cooking of the hamburger being a main cause of poisoning from E. coli. Often times, restaurant owners are fearful of under cooking the food product to the extent that the outer portion of the food product becomes significantly over cooked resulting in the above-noted problems as well as dryness of the product. Accordingly, in order to provide the consumer with a palatable product, the meat product is often times left under cooked in the interior and consequently can result in significant consumer health problems.

In addition to the foregoing issues relating to consumer health, direct energy consumption, which can be significant in commercial cooking, as well as other indirect energy consumptions, also can have an important economic impact. For example, in restaurants, fast food eating establishments, institutions and the like, griddles generate significant heating effects in the kitchen, create cooking odors and if gas fired, draw combustion air from the kitchen to generate combustion gases. In such establishments, it is common practice to employ large exhaust hoods above the cooking device for maintaining the kitchen in a properly vented condition, with the kitchen area likewise being air-conditioned on a continuous basis. Accordingly, due to the high cost of energy, improvements in either direct or indirect energy utilization, is also of a concern.

One effort to overcome the aforementioned shortcomings set forth in U.S. Pat. No. 4,660,542 issued to Scherer which discloses a cooking system particularly adaptable for commercial or institutional usage which includes a closed loop heat transfer circuit having a heating and vaporization zone which is adaptable to a griddle type cooking arrangement. However, the arrangement set forth therein merely passes a heating medium in the form of water vapor through a conduit system underlying a surface of the griddle in order to heat such griddle. This conduit system is similar to a radiator wherein the conduits are heated by the heating medium which subsequently heats the air below an underside of the griddle cooking surface a consequently the cooking surface itself. In this regard, the areas of the cooking surface directly adjacent the conduits are consequently heated to a greater degree than those portions of the heating surface which are not directly adjacent to a conduit. Moreover, should one or more of the conduits become slogged due to deposits in the heating medium, this non-uniform heating of the cooking surface would be exaggerated. Accordingly, the effect of such a system is not that different than an electrical or gas heated griddle.

Clearly, there is a need for a griddle type heating surface wherein a temperature of the griddle heating surface is substantially uniform across the 5 entire surface. Moreover, there is a need for a griddle type cooking device wherein portions of the griddle heating surface are not permitted to increase to an excessive temperature. Additionally, there is a need for a griddle type cooking surface wherein under cooking of the food product is minimized thereby providing for a more healthy food product.

SUMMARY OF THE INVENTION

The primary object of the present invention is to overcome the aforementioned shortcomings associated with the prior art devices.

A further object of the present invention is to provide a griddle type cooking surface wherein the temperature of the cooking surface is maintained uniform over the entire surface thereof.

A still further object of the present invention is to provide a griddle type cooking surface wherein the temperature of the cooking surface is maintained at a uniformed temperature over the entire surface regardless of the cooking of the food product thereon.

A still further object of the present invention is to provide a griddle type cooking device wherein a substantially uniform temperature of the cooking surface is ensured, thus eliminating the necessity for multiple temperature sensors.

Yet another object of the present invention is to provide a griddle type cooking surface wherein over cooking of an outer surface of the food product is minimized in order to substantially reduce or eliminate the generation of mutagens or carcinogens.

Yet another object of the present invention is to provide a griddle type cooking surface wherein under cooking of the food product is minimized thus eliminating harmful bacteria within the food product.

These, as well as additional objects of the present invention, are achieved by providing a uniform temperature cooking device in the form of a griddle including a cooking medium chamber having a substantially planar top cooking surface, a bottom surface and side walls housing a heating medium contained within such cooking medium chamber for heating the top cooking surface. A heating source is provided for heating the heating medium along with a control means for controlling the temperature of the top cooking surface. In this manner, the heating medium contacts the underside of the top cooking surface directly, thus ensuring a substantially uniform heating of the top cooking surface. In the preferred embodiment, the heating medium is water wherein steam is generated for heating the top cooking surface.

These as well as additional advantages of the present invention will become apparent from the following detailed description of the present invention when read in light of the figures.

BRIEF DESCRIPTION OF THE DRAWINGS

FIG. 1 is a cross-sectional view of a cooking system set forth in accordance with the present invention.

FIG. 2 is a cross-sectional view of the top surface of the cooking system in accordance with the present invention taken along line II—II of FIG. 1..

DETAILED DESCRIPTION OF THE INVENTION

As described hereinabove, the present invention is directed to a uniform temperature cooking surface and particularly to a griddle 10 illustrated in FIG. 1. The griddle 10 includes a substantially planar cooking surface 12 upon which a food product such as a hamburger 14 or the like is placed. Supporting the cooking surface 12 is a support structure 16 which itself is supported by legs 18. Any known support structure may be utilized. Moreover, the cooking surface and support structure 16 may be permanently mounted within a kitchen facility. The support structure 16 includes the cooking surface 12 as well as a bottom surface 20 and side walls 22. The side walls 22 extend around an entire periphery of the support structure 16 in order to accommodate various components of the cooking system.

One such component is the heating elements 24 which may be in the form of electric heating coils, gas burners or the like. Any known heating device may be utilized in order to heat the heating medium 26 contained within a sealed subchamber 28. The heating medium in accordance with the present invention is preferably water, however, other heating mediums may be utilized. It should be noted that the heating elements may be positioned within the subchamber 28 or adjacent such chamber.

Positioned within the sealed sub-chamber 28 are supports 30 which aid in supporting the cooking surface in a substantially horizontal position as illustrated in FIG. 1. Additionally, the supports 30, because they are welded in place, prevent the sub-chamber 28 from expanding due to pressure build-up within the sub-chamber 28. Also, enclosed within the support structure or cooking medium chamber 16 is insulation material 32. This insulation material may be of any known type and aids in energy savings associated with the device.

As with most griddle type cooking devices, adjacent the cooking surface 12 is a grease catcher 34 and associated grease pan 36. During the cooking of the food product, grease in the form melted fat and juices from the meat product emanate from the meat product and are directed into the grease catcher 34 away from the food product. As can be appreciated from FIG. 1, the heating medium 26 is heated directly by the heating elements 24 and thus once the boiling point is reached, creates steam 38 within the subchamber 28 adjacent an underside of the cooking surface 12.

This steam generated within the sub-chamber 28 heats the cooking surface 12 in a substantially uniform manner. That is, any point on the cooking surface 12 will be substantially the exact same temperature as any other portion of the cooking surface 12. Accordingly, the system requires only a single temperature sensor 40 provided for controlling the temperature of the cooking surface 12.

As noted hereinabove, current griddles add heat over a large area and the heat is removed only in the area where the product is cooked, which causes the other surfaces of the griddle to rise in temperature. With the cooking system set forth in accordance with the present invention, such variation in the cooking temperature of the cooking surface 12 are eliminated and the temperature of the cooking surface 12 is substantially uniform because the steam and water in the sub-chamber 28 keep a surface temperature of the griddle the same at all times. That is, because the cooking system in accordance with the present invention uses water and steam in a chamber directly under the cooking surface 12 to transfer the heat to the surface, a substantially uniform cooking temperature is achieved. The temperature of the cooking surface 12 is substantially the same over its entire surface regardless of how the surface is used.

In accordance with the present invention, a thermostat, which receives a signal from the temperature sensor 40 indicative of the surface temperature, is positioned within the control module 42 such that the heating elements are controlled so as to add heat to the water and steam causing the cooking surface to rise to a desired temperature, this temperature being in the range 250 to 450° F. and preferably 300° F. With the present invention, once the cooking surface 12 is heated to the desired temperature and a food product 14, such as a hamburger, is placed on the cooking surface 12, the placement of this food product lowers the surface temperature of the cooking surface 12 causing the pressure in the steam chamber to be reduced, which causes the water in the steam chamber to boil. Water condenses under the area where the food product has been placed thus adding heat to the food product. In order for there to be temperature difference on the surface of the griddle, there would have to be a pressure difference in the water and steam chamber, which in accordance with the present invention, is impossible. Consequently, the cooking surface is maintained at a substantially uniform temperature. In this regard, the food product may be readily cooked at an even temperature regardless of where it is placed on the cooking surface 12 and regardless of how many and the timing of the placement of other food products.

As noted hereinabove, current griddles add heat over the large area and the heat is removed only in the area where the product is cooked which causes the other portions of the cooking surface to go up in temperature. Thus, when a food product is placed on the surfaces having elevated temperatures, the outer surface of the food product will be rapidly cooked while the inner surface remains uncooked. Thus, the food product cooked in this manner may result in either a food product which is not fully cooked on the inside thereby exposing the consumer to poisoning from E. coli or creates mutagens and carcinogens on the surface of the food product in that the surface becomes to well done due to the elevated temperature. In this regard, as is apparent from the present invention utilizing the substantially uniform cooking surface which cannot be subject to temperature variations is of great benefit. Hingedly connected to the port structure 16 may be a closure 44 which includes a handle 46 and supports the control module 42. This closure 44 need not be present, however, the use of such closure can shorten the cooking time of the food product. In addition to the port of the control module 42, the closure 44 may include a second cooking surface 48 which is supported by the closure 44 as illustrated in FIG. 2. FIG. 2 illustrates only the closure 44 in detail. Therein, the closure 44 includes heating elements 50 which are secured in place within the closure 44 and includes insulation material 52 for aiding in the efficiency of the heating element 50. Adjacent the heating element 50 is a second sealed sub-chamber 54 which houses a heating medium 56 such as water and includes space for steam generated from the water 56.

In this clam shell type arrangement, the same principle applies to the top surface of the clam shell created by the closure 44 which allows the bottom surface 48 of the closure 44 to be maintained at a substantially uniform temperature. It should be noted that the upper heating portion is not necessary for cooking food products in accordance with the present invention, however such an upper heating system can shorten the cooking time of the food product.

Accordingly, because the surface temperature of the cooking surface 12 of the cooking system is the same at all times, the thermostat control can sound an alarm by way of a suitable alarm means and circuitry if the surface temperature of the cooking surface 12 falls below or rises above predetermined safe temperatures for cooking the food product. In doing so, the possibility of a food product such as a hamburger being under cooked or over cooked is virtually eliminated. As noted hereinabove, under cooking of a food product such as a hamburger is the main cause of poison from E. coli, while overcooking of the food product can create mutagens and carcinogens which are undesirable as well. Additionally, if a clam shell type system as described hereinabove is utilized, the thermostat can include a timing feature which can be formed by suitable circuitry in a known manner and would start when the clam shell is closed and would open at a time when the food product is finished due to the even and unfluctuating surface temperature.

Additionally, in the event that the temperature within the cooking system raises prior to the cooking time expiring, an alarm would likewise sound so as to avoid overcooking the outer surface of the food product.

Accordingly, in accordance with the present invention, a cooking system and more specifically, a griddle type cooking system having a heating surface wherein a temperature of the griddle heating surface is substantially uniform across the entire surface is provided. Further, this uniform surface temperature is maintained even when food products are placed on only a portion of the cooking surface. Further, a cooking system is provided wherein overcooking of an outer surface of the food product is minimized in order to substantially reduce or eliminate the generation of mutagens or carcinogens while under cooking of the food product is likewise minimized thus eliminating harmful bacteria within the food product. In this regard, the cooking system is provided including a sealed cooking medium chamber having a substantially planar top cooking surface, a bottom surface and side walls for housing a heating medium in the form of water. A mechanism for heating the water within the cooking medium chamber is provided either within the chamber itself or adjacent the chamber with a control means being provided to control a temperature of the top cooking surface wherein the temperature of the top cooking surface is uniform over an entire exposed surface of the top cooking surface.

While the present invention has been described with reference to the preferred embodiment, it will be appreciated by those skilled in the art that the invention may be practiced otherwise then as specifically described herein without departing from the spirit and scope of the invention. It is, therefore, to be understood that the spirit and scope of the invention be limited only by the appended claims.

I claim:

1. A uniform temperature cooking device comprising:
   a substantially planar food supporting means, said food supporting means having a substantially planar top cooking surface;
   a vaporizable heating medium;
   a heating means for vaporizing at least a portion of said vaporizable heating medium; and
   a directing means for directing the vaporized heating medium into contact with an opposing side of said food supporting surface from said top cooking surface for maintaining said top cooking surface at a substantially uniform temperature.

2. The device of claim 1, wherein said heating medium is water.

3. The device of claim 1, further comprising a second cooking surface in an opposed relationship to said top cooking surface.

4. The device of claim 3, wherein said second cooking surface forms a bottom surface of a second cooking chamber.

5. The device of claim 4, wherein said second cooking chamber includes a top surface and side walls, a heating medium contained in said second cooking chamber and a heating means for heating said second heating medium.

6. The device of claim 5, wherein said second cooking chamber is hingedly connected to said cooking chamber.

7. The device of claim 1, further comprising a vaporizable heating medium chamber for accommodating said vaporizable heating medium including said substantially planar food supporting means, a bottom surface and side walls.

8. The device of claim 7, wherein said vaporizable heating medium chamber is a sealed, self-contained unit.

9. The device as defined in claim 1, further comprising a control means for controlling a temperature of said top cooking surface.

10. The device of claim 9, wherein a temperature of said top cooking surface is uniform over an entire exposed surface of said top cooking surface.

11. The device of claim 10, further comprising a temperature sensing means for sensing a temperature of said top cooking surface.

12. The device of claim 11, wherein a single temperature sensor senses a temperature of the entire top cooking surface.

13. The device of claim 12, further comprising an alarm means for indicating when a temperature of said top cooking surface varies a predetermined amount from predetermined top cooking surface temperature.

14. The device of claim 1, wherein said substantially uniform temperature is in a range of 250° F. to 450° F.

15. The device of claim 1, wherein said substantially uniform temperature is approximately 300° F.

16. A cooking device having a cooking surface of a substantially uniform temperature, comprising:

a sealed chamber including a substantially planar food supporting surface having a cooking surface and an opposing vaporized heating medium contacting surface, a bottom surface and side walls;

a heating source; and a vaporizable heating medium, vaporizable by said heating source for contacting said contacting surface;

wherein said sealed chamber is of a constant pressure and a temperature of said cooking surface is maintained at a substantially uniform temperature.

17. The device of claim 16, wherein said heating medium is water.

18. The device as defined in claim 17, further comprising a control means for controlling a temperature of said top cooking surface.

19. The device of claim 18, wherein said substantially uniform temperature is in a range of 250° F. to 450° F.

20. The device of claim 18, wherein said substantially uniform temperature is in a range of 300° F.

* * * * *